Patented Dec. 31, 1940

2,226,809

UNITED STATES PATENT OFFICE 2,226,809

NUCLEAR FLUORINATED VINYL AROMATIC HYDROCARBONS

Robert R. Dreisbach, Midland, Mich., assignor to The Dow Chemical Company, Midland, Mich., a corporation of Michigan No Drawing. Application August 29, 1939, Serial No. 292,457

10 Claims. (Cl. 260—91)

This invention relates to nuclear fluorinated vinyl aromatic hydrocarbons and to a method of making them. It also concerns the polymers of these substances.

Although a large number of nuclear chlorinated, brominated, and iodinated vinyl aromatic hydrocarbons have been described in the prior art, the corresponding fluorinated compounds have remained entirely unknown. It has now been found that nuclear fluorinated vinyl aromatic hydrocarbons may readily be prepared by the dehydration of nuclear fluorinated $\beta$-aryl ethyl alcohols. The products so obtained are water-white volatile liquids which have chemical reactivities altogether unlike those of the corresponding known chloro- and bromo-compounds. In addition, the new compounds may be polymerized to resinous solids which resemble polystyrene in appearance, but have advantageous optical properties. The new fluorinated vinyl aromatic hydrocarbons are further characterized by unique behavior upon co-polymerization with other polymerizable organic compounds.

The nuclear fluorinated $\beta$-aryl ethyl alcohols used as starting materials in making the compounds of the invention are suitably prepared by the Grignard reaction from the corresponding fluoro-bromo-aromatic hydrocarbons. For example, fluoro-phenyl-ethyl alcohol is obtained by converting fluoro-bromobenzene into fluorophenyl magnesium bromide, and reacting the latter in ether solution with ethylene oxide.

The fluorinated $\beta$-aryl alcohols so obtained may be dehydrated by heating at temperatures of 150°–300° C., preferably in the presence of a dehydration catalyst such as an alkali metal hydroxide. In each case the fluorinated vinyl compound thus formed volatilizes from the dehydration zone, and may be condensed and separated from any impurities by fractional distillation or other suitable procedure.

The nuclear fluorinated vinyl aromatic hydrocarbons thus prepared may be polymerized by heating at an elevated temperature, e. g. 80°–170° C., for 15–100 hours. Alternatively, the compounds may be polymerized by allowing them to stand for long periods of time at room temperature, by the use of polymerization catalysts such as benzoyl peroxide, and similar methods. The polymers obtained are glass-like solids resembling polystyrene in appearance and physical properties, but having a much lower optical dispersion.

The term "vinyl aromatic hydrocarbons" as herein employed refers to aromatic hydrocarbons, especially mono-nuclear aromatic hydrocarbons, in which the vinyl ($CH_2$=$CH$—) group is attached to the hydrocarbon nucleus. Examples of the nuclear fluorinated vinyl aromatic hydrocarbons which may be prepared and polymerized according to the invention are: fluoro-styrene (both the ortho and para isomers), difluoro-styrene, o-fluoro-p-methyl styrene, p-fluoro-ortho-ethyl styrene, vinyl-naphthalene, etc.

The following examples will illustrate the invention, but are not to be construed as limiting its scope:

Example 1

A vessel was charged with 100 parts by weight of solid potassium hydroxide and heated to a temperature of 210°–230° C. A charge of 152 parts of a mixture of isomeric fluoro $\beta$-phenyl ethyl alcohols (B. P. 222°–225° C., specific gravity 1.133) was run slowly into the vessel and allowed to fall onto the hot potassium hydroxide. The charge was dehydrated and vaporized almost instantly, and the vapors were withdrawn, condensed, and allowed to separate into layers. The aqueous layer was removed, and 96 parts of an oily layer containing about 25 per cent of fluoro-styrene and 75 per cent of unchanged fluoro $\beta$-phenyl ethyl alcohol was recovered. This layer was mixed with 9 parts of boric acid, which formed an ester with the fluoro alcohol but not with the fluoro-styrene. The latter was then distilled off, there being recovered 20 parts of a mixture of isomeric fluoro-styrenes, a water-white liquid having a boiling point of 148°–149° C. at 760 millimeters, a freezing point of —33° C., a specific gravity (25°/25° C.) of 1.021, a refractive index ($nD$) of 1.512, and an optical dispersion ($n_f$—$n_c$) of 0.0205.

Example 2

A sample of fluoro-styrene prepared as in Example 1 was heated at a temperature of 125° C. for 72 hours, whereby it was converted to a glass-like solid. This material was then ground and molded into a test specimen at a temperature of 150° C. The molded specimen had a tensile strength of 6800 pounds per square inch, and an impact strength (A. S. T. M. 256–34T) of 1.2 inch-pounds. The specimen was a clear resin and had an optical dispersion much lower than that of polystyrene.

Other modes of applying the principle of the invention may be employed instead of those explained, change being made as regards the details disclosed, provided the product or method stated in any of the following claims, or the equivalent thereof, be employed.

I claim:

1. As new compounds, nuclear fluorinated vinyl aromatic hydrocarbons, being colorless volatile liquids.

2. As a new product, a mixture of isomeric fluoro-styrenes, a colorless liquid having a boiling point of about 148°–149° C. at 760 millimeters pressure, and a specific gravity of 1.021 at 25°/25° C.

3. The method of making a nuclear fluorinated aromatic hydrocarbon which comprises heating a nuclear fluorinated β-aryl ethyl alcohol at a temperature between 150° and 300° C. in the presence of a dehydration catalyst.

4. The method of making a nuclear fluoro-styrene which comprises heating a nuclear fluoro β-phenyl ethyl alcohol at a temperature between 150° and 300° C. in the presence of a dehydration catalyst.

5. The method of making a nuclear fluoro-styrene which comprises dropping a nuclear fluoro β-phenyl ethyl alcohol onto an alkali metal hydroxide maintained at a temperature between 150° and 300° C., whereby the said alcohol is converted into a vapor mixture comprising fluoro-styrene, and recovering the fluoro-styrene from the mixture.

6. As new synthetic resins, polymerized nuclear fluorinated vinyl aromatic hydrocarbons.

7. As a new synthetic resin, polymerized fluoro-styrene.

8. As a new synthetic resin, the product obtained by polymerizing a mixture of isomeric nuclear fluoro-styrenes.

9. The method which comprises heating a nuclear fluorinated vinyl aromatic compound at a temperature between 80° to 170° C. until polymerization is substantially complete.

10. The method which comprises heating fluoro-styrene at a temperature between 80° and 170° C. until polymerization is substantially complete.

ROBERT R. DREISBACH.